(12) United States Patent  
Schilling (10) Patent No.: US 8,412,178 B2  
(45) Date of Patent: Apr. 2, 2013

(54) MECHANISM FOR FACILITATING DYNAMIC AND SEGMENT-BASED MONITORING OF CELLULAR NETWORK PERFORMANCE IN AN ON-DEMAND SERVICES ENVIRONMENT

(75) Inventor: Richard Schilling, Seattle, WA (US)

(73) Assignee: Salesforce.com, Inc., San Francisco, CA (US)

( * ) Notice: Subject to any disclaimer, the term of this patent is extended or adjusted under 35 U.S.C. 154(b) by 0 days.

(21) Appl. No.: 13/345,496

(22) Filed: Jan. 6, 2012

(65) Prior Publication Data

US 2013/0053019 A1   Feb. 28, 2013

Related U.S. Application Data

(60) Provisional application No. 61/528,859, filed on Aug. 30, 2011.

(51) Int. Cl.  
*H04W 4/00* (2009.01)
(52) U.S. Cl. .................. 455/422.1; 370/253; 709/228
(58) Field of Classification Search ............... 455/422.1; 370/252, 402, 410, 338; 379/272, 269; 709/223, 709/238, 227, 249; 726/22; 340/2.1  
See application file for complete search history.

(56) References Cited

U.S. PATENT DOCUMENTS

| | | | | |
|---|---|---|---|---|
| 5,371,733 A | * | 12/1994 | Denneau et al. | 370/241 |
| 6,151,326 A | * | 11/2000 | McGuire et al. | 370/402 |
| 6,396,811 B1 | * | 5/2002 | Petersen | 370/250 |
| 7,600,029 B1 | * | 10/2009 | Mashinsky | 709/228 |
| 2005/0038833 A1 | * | 2/2005 | Colrain et al. | 707/203 |
| 2006/0258343 A1 | * | 11/2006 | Schotten | 455/418 |
| 2011/0142078 A1 | * | 6/2011 | Wong et al. | 370/503 |

* cited by examiner

*Primary Examiner* — Mahendra Patel  
(74) *Attorney, Agent, or Firm* — Blakely, Sokoloff, Taylor & Zafman (57) ABSTRACT

In accordance with embodiments, there are provided mechanisms and methods for facilitating dynamic and segment-based monitoring of cellular network performance. In one embodiment and by way of example, a method includes dividing a cellular network path of a cellular network into a plurality of network segments, and monitoring performance of the cellular network at a first network segment of the plurality of network segments. The first network segment is associated with a first segment point includes a first computing device. The method may further includes generating first metrics based on first monitoring data relating to the first network segment, and forwarding the first metrics to a second segment point coupled with the first segment point over the first network segment. The second segment point includes a second computing device.

15 Claims, 5 Drawing Sheets

MECHANISM FOR FACILITATING DYNAMIC AND SEGMENT-BASED MONITORING OF CELLULAR NETWORK PERFORMANCE IN AN ON-DEMAND SERVICES ENVIRONMENT

CLAIM OF PRIORITY

This application claims the benefit of U.S. Provisional Patent Application No. 61/528,859, entitled "Systems and Methods for Cellular Network Performance Tagging" by Richard Schilling, filed Aug. 30, 2011, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamic and segment-based monitoring of cellular network performance.

BACKGROUND

Collecting useful information in a cellular network environment is a well-known challenge. Conventional techniques for collecting such information are known to overload the cellular network and are regarded as complex, expensive, and inefficient.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY

In accordance with embodiments, there are provided mechanisms and methods for facilitating dynamic and segment-based monitoring of cellular network performance. In one embodiment and by way of example, a method includes dividing a cellular network path of a cellular network into a plurality of network segments, and monitoring performance of the cellular network at a first network segment of the plurality of network segments. The first network segment is associated with a first segment point includes a first computing device. The method may further includes generating first metrics based on first monitoring data relating to the first network segment, and forwarding the first metrics to a second segment point coupled with the first segment point over the first network segment. The second segment point includes a second computing device. In one embodiment, the mechanisms and methods are provided through an on-demand services environment.

While the present invention is described with reference to an embodiment in which techniques for facilitating management of data are implemented in a system having an application server providing a front end for an on-demand database service capable of supporting multiple tenants, the present invention is not limited to multi-tenant databases nor deployment on application servers. Embodiments may be practiced using other networking and/or database architectures without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Methods and systems are provided for facilitating dynamic and segment-based monitoring of cellular network performance. The facilitating and monitoring, in one embodiment, are provided in an on-demand services environment. In one embodiment and by way of example, a method includes dividing a cellular network path of a cellular network into a plurality of network segments, and initiating monitoring of performance of the cellular network at a first network segment of the plurality of network segments. The first network segment is associated with a first segment point includes a first computing device. The method may further includes generating first metrics based on first monitoring data relating to the first network segment, and forwarding the first metrics to a second segment point coupled with the first segment point over the first network segment. The second segment point includes a second computing device.

Next, mechanisms and methods for dynamic and segment-based monitoring of cellular network performance will be described with reference to example embodiments.

Figure 1:
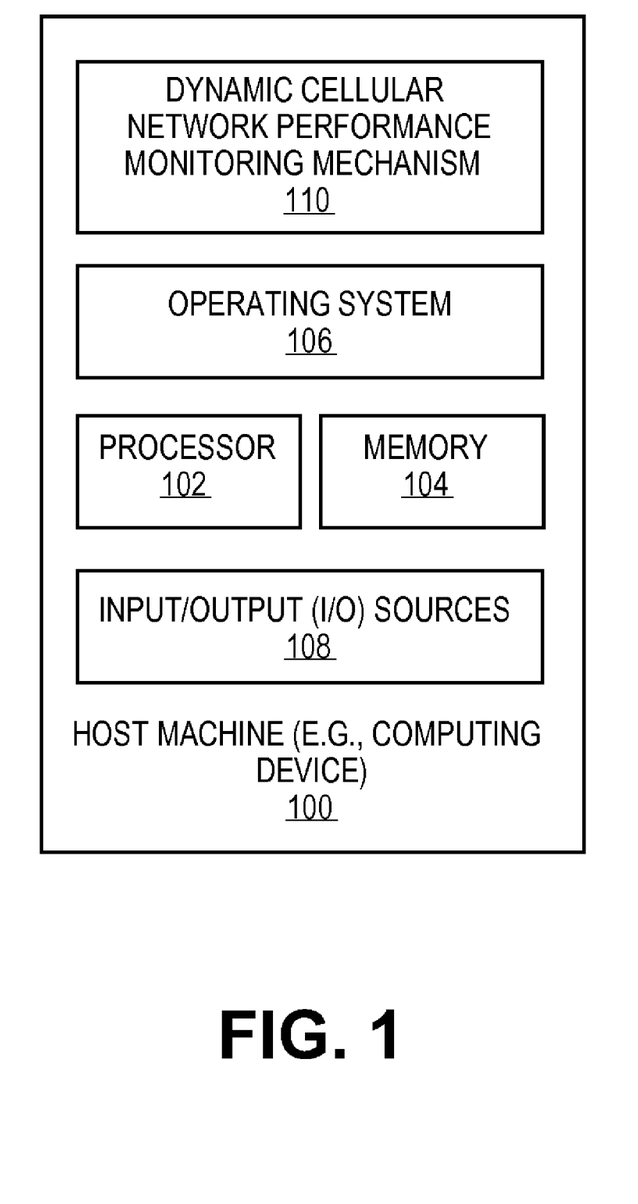
FIG. 1 illustrates a computing system employing a dynamic cellular network performance monitoring mechanism according to one embodiment.

FIG. 1 illustrates a computing system employing a dynamic cellular network performance monitoring mechanism according to one embodiment. In one embodiment, a computing device 100 serves as a host machine hosting a dynamic cellular network performance monitoring mechanism ("cellular monitoring mechanism") 110 to facilitate dynamic, segment-based, customized, inexpensive, and efficient monitoring of cellular network performance. Computing device 100 serving as a host machine may include server computers, desktop computers, cluster-based computers, laptop computing devices (e.g., notebooks, netbooks, etc.), set-top boxes (e.g., Internet-based cable television set-top boxes, etc.), and the like. Computing device 100 may also include mobile computing devices, such as cellular phones including smartphones (e.g., iPhone®, BlackBerry®, etc.), handheld computing devices, personal digital assistants (PDAs), etc., tablet computers (e.g., iPad®, Samsung® Galaxy Tab®, etc.), laptop computers, e-readers (e.g., Kindle®, Nook®, etc.), Global Positioning System (GPS)-based navigation systems, etc.

Computing device 100 includes an operating system 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "machine", "host machine", "device", "computing device", "computer", "computing system", "multi-tenant on-demand data system", and the like, are used interchangeably throughout this document to illustrate various environments that may implement one or more aspects of the invention. It is to be further noted that terms like "application", "software application", "program", "software program", "package", and "software package" are used interchangeably throughout this document to illustrate various environments that may implement one or more aspects of the invention.

In one embodiment, a dynamic cellular network performance monitoring mechanism 110 performs monitoring of performance of a cellular network (divided into multiple segments) from the perspective of a user computing device (e.g., a mobile device, such as a smartphone). This can be accomplished, for example, by measuring the data speed during, for example, Application Programming Interface (API) calls, which forms the application layer performance data. For example, a simple token identifier may be generated at the application layer, such as using the Cyclic Redundancy Check (CRC) code of the data collected to this segment point in the cellular network. Further, the application layer performance may be tagged with hardware-generated data which can uniquely identify the user computing device's data without any user intervention. This, for example, may include coarse-grained GPS data (e.g., network data, etc.), fine-grained GPS data, atomic clock reading from GPS, etc. The data may also be identified with unique information about the user computing device, such as the mobile device's unique identifier (e.g., an Employer Identification Number (EIN) number, etc.) may also be collected. Other information, such geo-tagging revealing geographic or physical locations (e.g., longitude, latitude, etc.) of the user computing device may be added to the data to provide and associate additional information with the monitoring data. Similar steps may be taken at other network segments and segment points (e.g., cellular tower, sever computer, etc.) to gather segment-based monitoring data relating to performance of the cellular network and provided to a database within a cloud network to be access and analyzed. This and other aspects of embodiments will be further described with reference to the subsequent figures.

Figure 2:
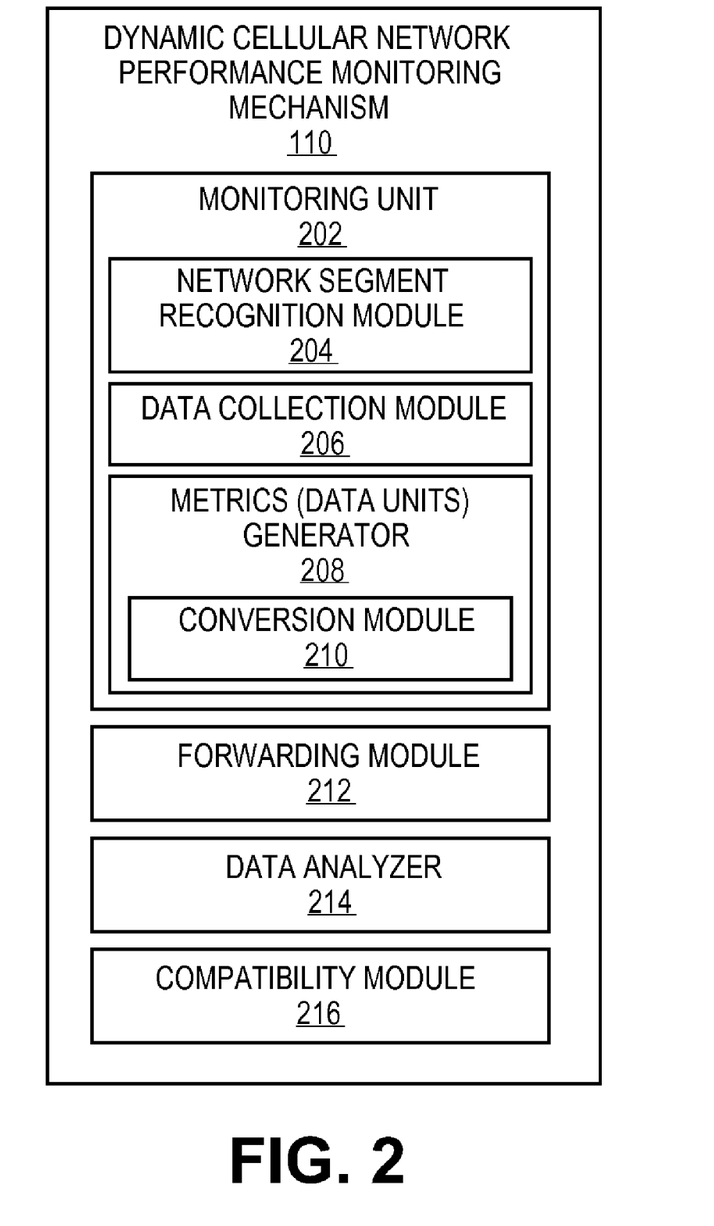
FIG. 2 illustrates a dynamic cellular network performance monitoring mechanism according to one embodiment.

FIG. 2 illustrates a dynamic cellular network performance monitoring mechanism according to one embodiment. In one embodiment, a dynamic cellular network performance monitoring mechanism 110, employed at and/or in communication with one or more computing devices serving as segment points within a cellular network, includes various components 202, 204, 206, 208, 210, 212, 214 and 216 to offer a number of services to facilitate dynamic monitoring of cellular network performance in a cellular network environment in a multi-tenant database system in an on-demand services environment. In one embodiment, the cellular monitoring mechanism 110 includes a monitoring unit 202, a forwarding module 212, data analyzer 214, and a compatibility module 212.

The monitoring unit 202, in one embodiment, includes a network segment recognition module 204 to recognize multiple segments of a cellular network and further to divide the cellular network into those multiple segments so that each segment can be individually and independently monitored without having to require the monitoring of the entire cellular network. This novel technique of dynamic segment-based monitoring provides clear and efficient monitoring that is particular to issues relating to each segment which prevents the monitoring data from getting convoluted and without having to overload the entire cellular network. For example and in one embodiment, a typical cellular network may be divided into (1) a radio link segment ("first segment") between a user computing device (e.g., a mobile device, such as a smartphone, a tablet computer, etc.) and a network or cellular tower, (2) a network segment ("second segment") between the cellular tower and a network or cellular gateway (e.g., a gateway computer), and (3) another network segment ("third segment") between the network gateway and a network computer (e.g., server computer) over a network (e.g., Internet), or the like. Further, a continuing segment may include a communication link between the server computer of the cellular network and a database associated with a computer system (e.g., server computer) in a cloud (e.g., via cloud computing) to maintain and provide access to the monitoring data collected from the various network segments.

A data collection module 204 is used to facilitate collection of monitoring data including that which is collected automatically by the segment point-based device (e.g., a user computing device) or manually entered by a user (e.g., a user of a mobile device, a system administrator at any of the segment points, such as at a cellular tower, a software developer, an employee, such as of a telecommunication company, an independent or industry-based analyst to analyze the collected monitoring data for potential improvements, etc.). In one embodiment, this monitoring data may be collected and gathered at the network segments (e.g., at the user mobile computing device itself at the first segment). For example, a mobile device's network connection may be lost and this connection loss may be automatically performed by the data collection module 204, which then gathers any information relating to the connection loss. Further, for example, the user of the mobile device notices the connection loss and manually enters information or monitoring data relating to the connection loss. Similarly, in one embodiment, various network issues (e.g., data speed, voice clarity, network clock, etc.) at multiple segments and segment points may be automatically detected by the data collection module 206 which then automatically gathers relevant monitoring data relating to the detected issues.

Figure 3:
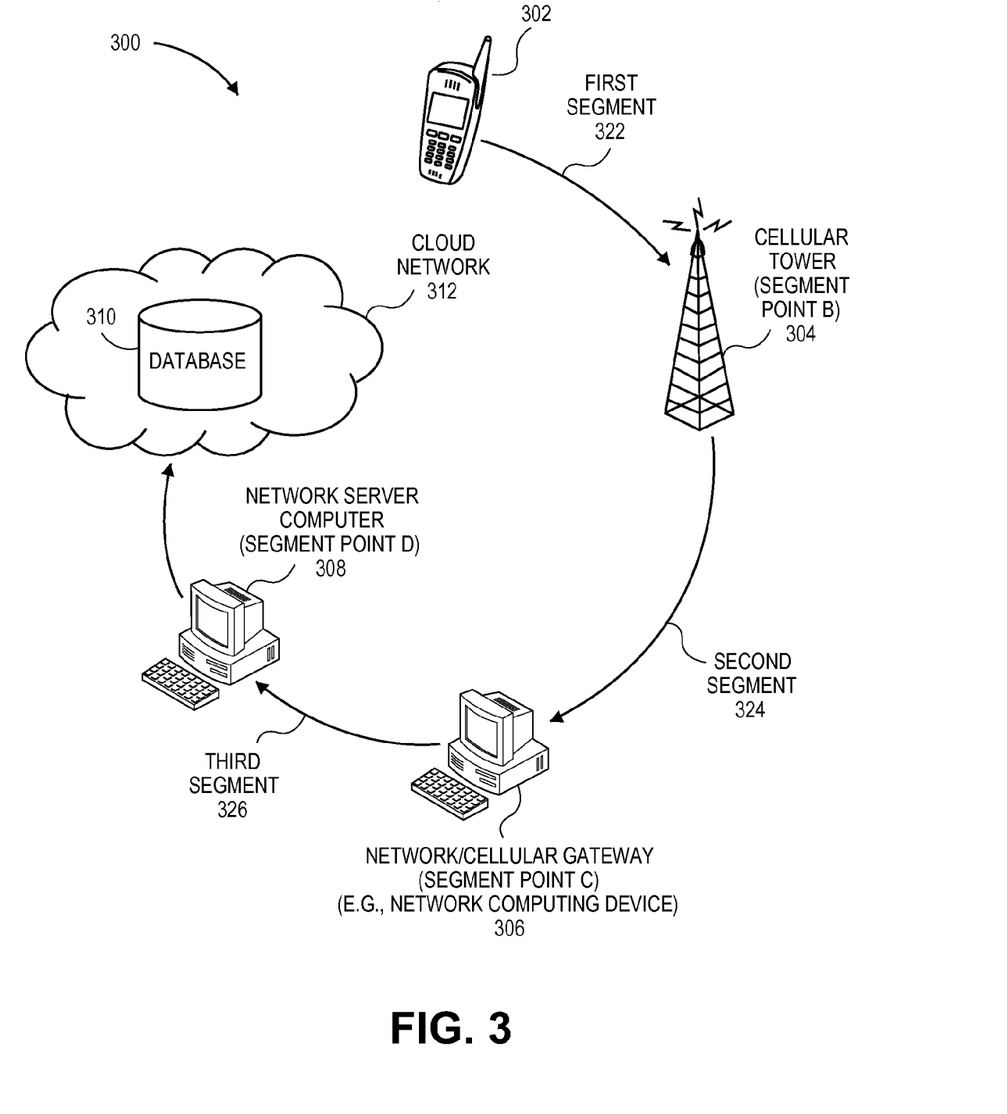
FIG. 3 illustrate a transaction sequence for dynamic and segment-based monitoring of cellular network performance using a dynamic cellular network performance monitoring mechanism according to one embodiment.

A metrics generator 208 then generates metrics using the gathered or collected monitoring data and, using its conversion module 210, performs any necessary conversion (e.g., converting monitoring data entered in English into software code or machine language, adding metrics to a network package, etc.). A network package or other digital data propagated across a link (e.g., a radio/microwave packet) refers to an arbitrary format and/or data frame. For example and in other words, a networking protocol may not matter and that each controlling node or segment point 302, 304, 306, 308 (e.g., cellular tower 304, cellular gateway 306, etc.) in the communication link can add data to the network package by inserting new monitoring data into a single existing network packet or by generating additional network packets having the new monitoring data. Examples of network protocols include, but limited to, packet radios, digital microwave network transmission protocols, IPv4 networking protocols, IPv6 networking protocols, etc. Further, each subsequent node or point (such as cellular tower 304, cellular gateway 306, network server computer 308, etc.) in the communication link may transmit its metrics with an entirely different protocol than the network protocol initially used to transmit the metric from the first node or end-user's node (such as mobile device 302). For example, although the mobile device 302 may use IPv4 as a network protocol, but a metric may be transmitted using User Datagram Protocol (UDP). In this case, there are multiple communication channels open between various network segments 322, 324, 326.

A metric refers to a "unit" of monitoring data (also referred to as "data unit", "monitoring data unit", "monitoring unit") that relates to a particular network monitoring observation, such as a particular network issue (e.g., data speed, connection loss, etc.). It is contemplated that a metric may be broadened (such as relating to all issues relating to a segment of the cellular network, etc.) or narrowed (such as relating to a particular aspect of a particular issue associated with a particular segment or segment point of the cellular network, etc.) as desired or necessitated. Although monitoring data may be stored at memory or data storage connected with any of the segment points, it is then converted into metrics and embedded into a network package also by the conversion module. In other words, the metric generator 208, using its conversion module 210, generates a metric based on monitoring data gathered at a user computing device and then inserts the metric into a network package which then forwarded on to other segments and segment points of the cellular network. Having these metrics, generated at each segment point, embedded into the same network package preserves the monitoring data contained within these metrics. Moreover, in one embodiment, at each segment point, new metrics, representing new or supplemental monitoring data, can be added to the existing metrics and then added to the same network package so the previously—as well as the newly-generated monitoring data can be protected against accidental or unwanted changes so it remains preserved, protected, and trusted.

A forwarding module 212 of the cellular monitoring mechanism 110 is responsible for navigating the network package (having metrics representing monitoring data) within the cellular network, such as forwarding it from one segment (or segment point) to another segment (or segment point). For example, a network package having metrics generated at a user computing device (e.g., smartphone) is forwarded on to the next segment point, such as a cellular/network tower where new metrics may be added to the network package. These new metrics may include new monitoring data relating to new issues relating to the cellular tower or segments of network surrounding it, or contain supplement monitoring data to supplement the existing monitoring data collected at previous segment point and contained within the existing metrics of the network package. Examples of monitoring data gathered at cellular towers may include tower identification, tower location, data speed, geo-tagging, timestamp, and performance issues (e.g., signal strength, etc.) particular to the cellular tower, etc.

Similarly, the forwarding module 212 forwards the network packaging (now having user computing device metrics and cellular tower metrics) to the next segment point, such as a network gateway computer. A network gateway computing device may include a server computer that serves as gateway to the network (e.g., the Internet, intranet, cloud computing, Local Area Network (LAN), Wide Area Network (WAN), Metropolitan Area Network (MAN), Personal Area Network (PAN), etc.). As with the previous segment points (e.g., user device, cellular tower), new gateway-related metrics may be added to the network package. For example, certain network performance-related monitoring data (e.g., network speed, signal strength, etc.) as well as certain supplemental data (e.g., atomic clock reading, timestamp, GPS location, data speed, server computer identification and location, etc.) may be added as new gateway metrics to the network package. Similarly, in one embodiment, the network package may be forwarded on to other subsequent network segments (e.g., a network server computer, etc.) to adopt additional metrics.

Once the network package has gone through the cellular network path, the forwarding module 212 forwards the network package on to a database and/or a computer device associated with the database for storage of the network package. This database may be cloud-based and accessed via a cloud network. In one embodiment, the network package may be deciphered and/or interpreted so that the monitoring data contained within its metrics may be provided to users who wish to access, review, and analyze issues relating to the cellular network. For example, the interpreted monitoring data may be provided as a monitoring report (such as in English, Chinese, etc.) and any user may be able to read and understand. Examples of such user may include a system administrator, a software developer, a marketing executive, etc., at one or more service providers (e.g., telecommunication companies, Internet service providers, etc.), software companies (e.g., software application providers, operating system providers, etc.), hardware companies (e.g., makers of smartphone, tablet computers, laptop computers, GPS navigation systems, etc.) who reviews and analyzes the monitoring report to, for example, fix any network-related problems (e.g., drop calls, slow data speed, better operating system, enhanced keyboard/touchpad, etc.) for their future versions to be sold to their customers (e.g., the user of a mobile device).

The cellular monitoring mechanism 100 further includes a compatibility module 212 that allows the cellular monitoring mechanism 110 to be dynamically and automatically compatible with any type of computer devices (e.g., computer device 100 of FIG. 1), software applications, cellular (e.g., phone, data, etc.) services and service providers, software development platforms, application servers, interfaces (e.g., Graphical User Interface (GUI)-based interfaces, etc.), Internet or hotspot service providers (e.g., telecommunication companies, etc.), and the like. It is to be noted that embodiments of the present invention are not limited to the metrics, the monitoring data, the mobile computing device, the segments, the segment points, etc., described herein with reference to FIG. 2 or elsewhere throughout this document.

It is contemplated that any number and type of components may be added to and removed from the cellular monitoring mechanism 110 to facilitate dynamic and segment-based performance monitoring of cellular networks. For brevity, clarity, ease of understanding and to stay focused on the cellular monitoring mechanism 110, many of the standard or known components, such as those of a computing device, are not shown or discussed here. It is contemplated that embodiments of the invention are not limited to any particular technology or standard and is dynamic enough to adopt and adapt to the changing technology and standards.

FIG. 3 illustrates a transaction sequence for dynamic and segment-based monitoring of cellular network performance using a dynamic cellular network performance monitoring mechanism according to one embodiment. In the illustrated transaction sequence 300, a computer devices is connected in a cellular network that is segmented into a first segment 322 that represents a radio link between a user computing device 302 (e.g., laptop computer, GPS navigation, smartphone, tablet computer, etc.), representing segment point A, and a cellular tower 304 (representing segment point B) and a second segment 324 connecting the cellular tower 304 and a network/cellular gateway 306 (e.g., a computing device) representing segment point C and a gateway to a network, such as the Internet. The cellular network in segmented into a third segment 326 between the cellular gateway 306 and a network server computer 308 (e.g., Internet server, Web server, etc.) representing segment point D.

As aforementioned, in one embodiment, using the cellular monitoring mechanism 110, cellular network performance data is collected and provided as data units referred to as metrics that are added to a network package at the user mobile device 302. The network package is then forwarded onto the cellular tower 304 over the first segment 322 where additional metrics may be added to the network package. Then, the network package is forwarded on to the cellular gateway 306 where more metrics may be added to the network package before it is forwarded on to the network server 308 while further metrics may be added. The next destination for the network package is a database 310 that is accessible over a cloud network 312 and where the network package is deciphered and provided in a simple form to the users for analysis.

In one embodiment, the cellular monitoring mechanism 110 of FIG. 1 may be employed at a single computing system, such as at the host machine 100 of FIG. 1 which may represent a host server computer system in the cloud 312 (such as associated with the database 310) or the network server computer 308 of FIG. 3, or the like, and provide an interface (e.g., a GUI-based interface) at each of the other participating machines, such as the network gateway 306, the cellular tower 304, the user computing device 302, etc., to facilitate dynamic and segment-based monitoring of cellular network performance. In another embodiment, the cellular monitoring mechanism 110 of FIG. 1 may be employed at a single host machine (such as the cloud-based host machine 100 of FIG. 1 or the network server computer 308), while certain components (e.g., monitoring unit 202, forwarding module 212, etc.) of the cellular monitoring mechanism 110 may be employed at the aforementioned other machines at segment points 302, 304, 306. In yet another embodiment, each computing system at each segment point 302, 304, 306, 308 may include an entire version of the cellular monitoring mechanism 110 of FIG. 1. It is contemplated that the host machine 100 of FIG. 1 may be any one of the segment point machines 302, 304, 306, 308, illustrated here, or a cloud-based machine (such as host machine 100 of FIG. 1) in communicated with the participating machines 302, 304, 306, 308.

Figure 4:
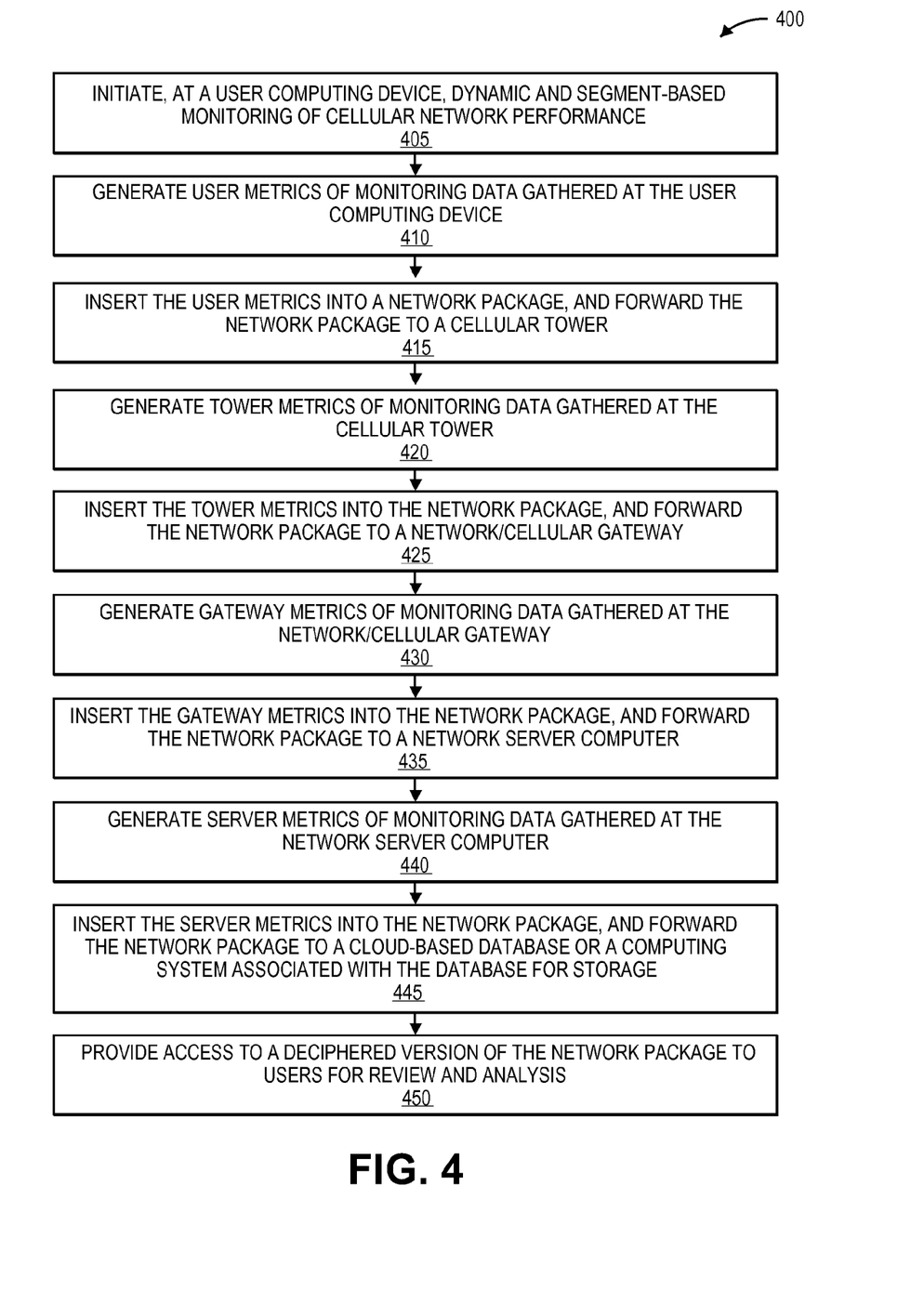
FIG. 4 illustrates a method for dynamic and segment-based monitoring of cellular network performance using a dynamic cellular network performance monitoring mechanism according to one embodiment.

FIG. 4 illustrates a method for dynamic and segment-based monitoring of cellular network performance using a dynamic cellular network performance monitoring mechanism according to one embodiment. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by the dynamic cellular network performance monitoring mechanism 110 of FIG. 1.

Method 400 begins at block 405 with initiation, at a user computing device (e.g., smartphone, tablet computer, laptop computer, GPS navigation system, etc.), of dynamic and segment-based monitoring of cellular network performance. The user computing device may be part of and serve as the first segment point of the cellular network performance. At block 410, monitoring data is gathered at the user computing device and then user metrics are generated based on the gathered monitoring data. At block 415, these user metric are inserted or embedded into (or added to) a network package of the cellular network and then, this network package is forwarded onto the cellular network's next segment point, such as a network/cellular tower that is in communication with the user computing device over a first segment of the cellular network.

At block 420, as with the user computing device, monitoring data is gathered at the network/cellular tower and then tower metrics are generated based on the gathered tower monitoring data. At block 425, these tower metrics are inserted into the network package and then, the network package is forwarded on to the next segment point, such as a network/cellular gateway computer that is in communication with the cellular tower over a second segment of the cellular network. At block 430, as with the first two segment points, monitoring data is gathered at the network/cellular gateway and then gateway metrics are generated based on the gathered gateway monitoring data. At block 435, these gateway metrics are inserted into the network package and then, this network package is sent on to the next cellular network segment, such as a network/cellular server computer which is in communication with the network/cellular gateway computer over a third segment of cellular network.

At block 440, monitoring data is gathered at the network/cellular server computer and then server metrics are generated based on the gathered server monitoring data. At block 445, the server metrics are inserted into the network package which is then forwarded onto a cloud-based database or a computing system associated with the database for storage of the network package. Further, at block 450, this network package is not only stored at the database, but also deciphered or interpreted so that it can be provided in a version (e.g., in the form of a report) that is acceptable to those users who wish to access, review, and analyze the interpreted version of the findings of the dynamic and segment-based monitoring of cellular network performance.

Figure 5:
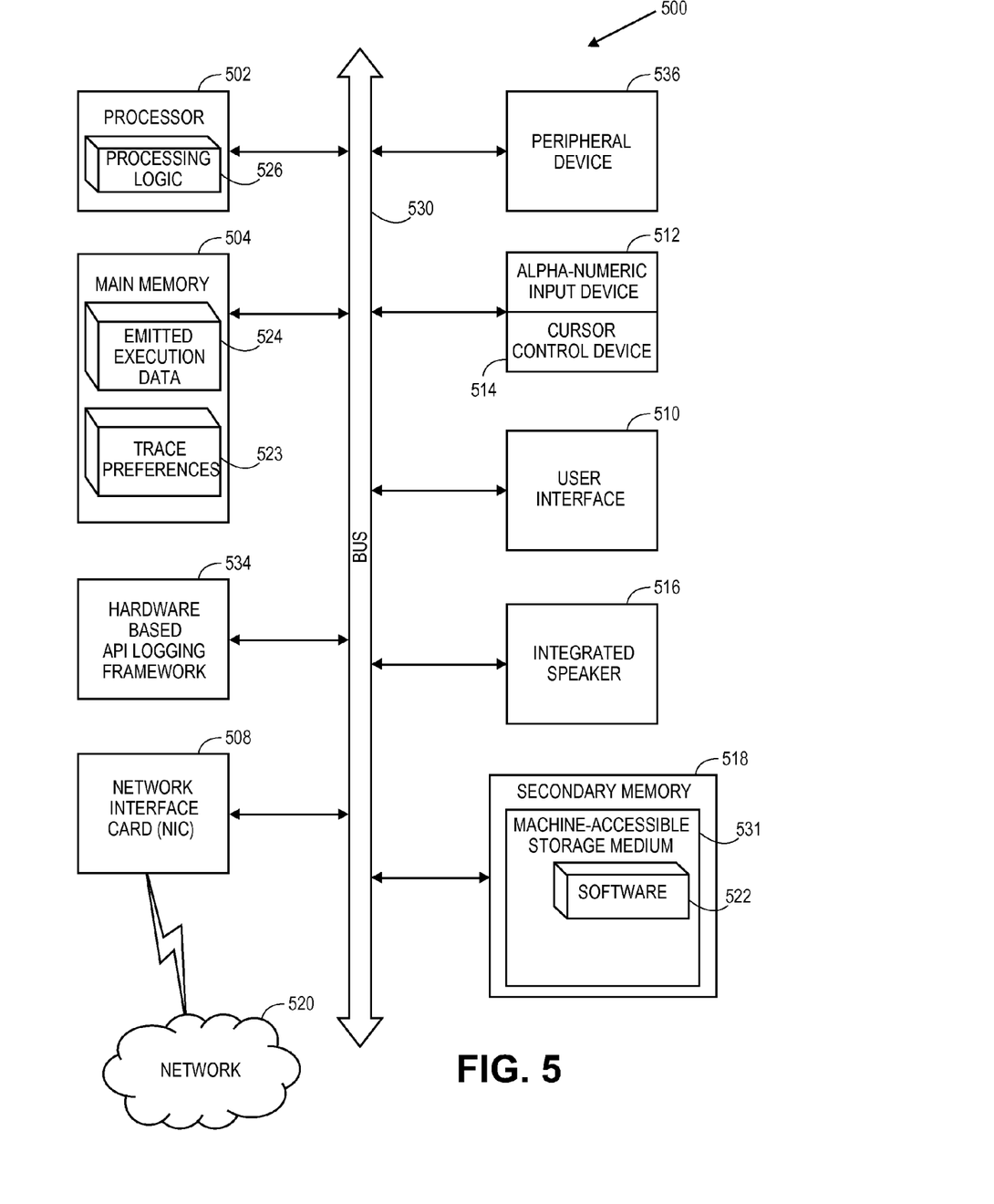
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 of FIG. 1. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of dynamic visual workflow mechanism 110 as described with reference to FIGS. 1 and 2 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of dynamic visual workflow mechanism 110 as described with reference to FIGS. 1 and 2 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

What is claimed is:

1. A computer-implemented method for segment-based monitoring of network performance, the method comprising:
   dividing a cellular network path of a cellular network into a plurality of network segments;
   monitoring performance of the cellular network at a first network segment of the plurality of network segments, wherein the first network segment is associated with a first segment point includes a first computing device;
   generating first metrics based on first monitoring data relating to the first network segment;
   forwarding the first metrics to a second segment point coupled with the first segment point over the first network segment, wherein the second segment point includes a second computing device;
   generating second metrics based on second monitoring data relating to the second network segment;
   forwarding the second metrics to a third segment point coupled with the second segment point over the second network segment, wherein the third segment includes a third computing device; and forwarding the first and second metrics and other metrics generated at subsequent network segments relating to subsequent segment points including computing devices coupled with the first, second and third computing devices, wherein forwarding comprises sending a network package to a network server, wherein a network server generates the first and second metrics relating to the first and second monitoring data and forwards the first and second server metrics to a database for storage, and wherein a deciphered and/or interpreted version of the first and second server metrics is made available at the database for review and analysis, and wherein review and analysis comprise reviewing and/or analyzing of issues relating to the cellular network, wherein the issues include at least one of drop calls, data speed, operating system performance, and Input/Output (I/O) source performance.

2. The computer-implemented method of claim 1, further comprising inserting the first, second and other metrics into a network package at each corresponding network segment point.

3. The computer-implemented method of claim 1, wherein the first, second and third computing devices comprise a server computer, a laptop computer, a personal digital assistant (PDA), a smartphone, a handheld computer, an e-reader, a tablet computer, a notebook, a desktop computer, a cluster-based computer, a set-top box, and a Global Positioning System (GPS)-based navigation system.

4. A system comprising:

a computing device having a memory to store instructions, and a processing device to execute the instructions, wherein the instructions cause the processing device to:

divide a cellular network path of a cellular network into a plurality of network segments;

monitor performance of the cellular network at a first network segment of the plurality of network segments, wherein the first network segment is associated with a first segment point includes a first computing device;

generate first metrics based on first monitoring data relating to the first network segment;

forward the first metrics to a second segment point coupled with the first segment point over the first network segment, wherein the second segment point includes a second computing device;

generate second metrics based on second monitoring data relating to the second network segment;

forward the second metrics to a third segment point coupled with the second segment point over the second network segment, wherein the third segment includes a third computing device; and forward the first and second metrics and other metrics generated at subsequent network segments relating to subsequent segment points including computing devices coupled with the first, second and third computing devices, wherein forwarding comprises sending a network package to a network server, wherein the network server generates the first and second metrics relating to the first and second monitoring data and forwards the first and second server metrics to a database for storage, and wherein a deciphered and/or interpreted version of the first and second server metrics is made available at the database for review and analysis, and wherein review and analysis comprise reviewing and/or analyzing of issues relating to the cellular network, wherein the issues include at least one of drop calls, data speed, operating system performance, and Input/Output (I/O) source performance.

5. The system of claim 4, wherein the processor is further to insert the first, second and other metrics into a network package at each corresponding network segment point.

6. The system of claim 4, wherein the first, second and third computing devices comprise a server computer, a laptop computer, a personal digital assistant (PDA), a smartphone, a handheld computer, an e-reader, a tablet computer, a notebook, a desktop computer, a cluster-based computer, a set-top box, and a Global Positioning System (GPS)-based navigation system.

7. A machine-readable non-transitory medium having stored thereon instructions which, when executed by a machine, cause the machine to:

divide a cellular network path of a cellular network into a plurality of network segments;

monitor performance of the cellular network at a first network segment of the plurality of network segments, wherein the first network segment is associated with a first segment point includes a first computing device;

generate first metrics based on first monitoring data relating to the first network segment;

forward the first metrics to a second segment point coupled with the first segment point over the first network segment, wherein the second segment point includes a second computing device;

generate second metrics based on second monitoring data relating to the second network segment;

forward the second metrics to a third segment point coupled with the second segment point over the second network segment, wherein the third segment includes a third computing device; and forward the first and second metrics and other metrics generated at subsequent network segments relating to subsequent segment points including computing devices coupled with the first, second and third computing devices, wherein forwarding comprises sending a network package to a network server, wherein the network server generates the first and second metrics relating to the first and second monitoring data and forwards the first and second server metrics to a database for storage, and wherein a deciphered and/or interpreted version of the first and second server metrics is made available at the database for review and analysis, and wherein review and analysis comprise reviewing and/or analyzing of issues relating to the cellular network, wherein the issues include at least one of drop calls, data speed, operating system performance, and Input/Output (I/O) source performance.

8. The machine-readable non-transitory medium of claim 7, wherein the machine is further to insert the first, second and other metrics into a network package at each corresponding network segment point.

9. The machine-readable non-transitory medium of claim 7, wherein the first, second and third computing devices comprise a server computer, a laptop computer, a personal digital assistant (PDA), a handheld computer, an e-reader, a tablet computer, a notebook, a desktop computer, a cluster-based computer, a set-top box, and a Global Positioning System (GPS)-based navigation system.

10. The computer-implemented method of claim 1, wherein the first and second metrics are generated using the monitoring data and by performing necessary conversion for programming or adding one or more of the first and second metrics to the network package, wherein the first and second metrics include new metrics relating to new monitoring data relating to new issues relating to the cellular network including one or more segments of the cellular network, wherein the first and second metrics further include supplemental metrics to supplement existing monitoring data collected at a previous segment point and contained within the network package.

11. The computer-implemented method of claim 1, wherein the network package comprises a data frame having one or more networking protocols including at least one of packet radios, digital microwave network transmission protocols, IPv4 networking protocols, IPv6 networking protocols, and User Datagram Protocol (UDP).

12. The system of claim 4, wherein the first and second metrics are generated using the monitoring data and by performing necessary conversion for programming or adding one or more of the first and second metrics to the network package, wherein the first and second metrics include new metrics relating to new monitoring data relating to new issues relating to the cellular network including one or more segments of the cellular network, wherein the first and second metrics further include supplemental metrics to supplement existing monitoring data collected at a previous segment point and contained within the network package.

13. The system of claim 4, wherein the network package comprises a data frame having one or more networking protocols including at least one of packet radios, digital microwave network transmission protocols, IPv4 networking protocols, IPv6 networking protocols, and User Datagram Protocol (UDP).

14. The machine-readable non-transitory medium of claim 7, wherein the first and second metrics are generated using the monitoring data and by performing necessary conversion for programming or adding one or more of the first and second metrics to the network package, wherein the first and second metrics include new metrics relating to new monitoring data relating to new issues relating to the cellular network including one or more segments of the cellular network, wherein the first and second metrics further include supplemental metrics to supplement existing monitoring data collected at a previous segment point and contained within the network package.

15. The machine-readable non-transitory medium of claim 7, wherein the network package comprises a data frame having one or more networking protocols including at least one of packet radios, digital microwave network transmission protocols, IPv4 networking protocols, IPv6 networking protocols, and User Datagram Protocol (UDP).

* * * * *